(12) United States Patent
Chang et al.

(10) Patent No.: US 7,534,522 B2
(45) Date of Patent: May 19, 2009

(54) CYLINDRICAL LITHIUM ION SECONDARY BATTERY HAVING FUNCTIONAL CENTER PIN

(75) Inventors: Seok Gyun Chang, Yongin-si (KR); Soon Ki Woo, Yongin-si (KR); Youn Han Chang, Yongin-si (KR); Yoo Eup Hyung, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 252 days.

(21) Appl. No.: 11/394,171

(22) Filed: Mar. 29, 2006

(65) Prior Publication Data

US 2006/0263676 A1 Nov. 23, 2006

(30) Foreign Application Priority Data

Mar. 30, 2005 (KR) .................... 10-2005-0026410

(51) Int. Cl.
*H01M 2/12* (2006.01)
*H01M 6/08* (2006.01)

(52) U.S. Cl. .......................... 429/82; 429/164

(58) Field of Classification Search .................. 429/53, 429/54, 56
See application file for complete search history.

(56) References Cited

U.S. PATENT DOCUMENTS

| 4,992,339 | A | * | 2/1991 | Georgopoulos | ................ 429/7 |
| 5,460,904 | A | * | 10/1995 | Gozdz et al. | ................ 429/316 |
| 2003/0148175 | A1 | * | 8/2003 | Iwanaga et al. | ............. 429/130 |

* cited by examiner

*Primary Examiner*—Dah-Wei D Yuan
*Assistant Examiner*—Adam A Arciero
(74) *Attorney, Agent, or Firm*—Christie, Parker & Hale, LLP

(57) ABSTRACT

A lithium ion secondary battery including an electrode assembly, a center pin positioned within the electrode assembly, a variable-length member coupled to the center pin, the variable-length member adapted to increase in length when an interior temperature of the center pin reaches a critical temperature, a can containing the electrode assembly, the center pin, and the variable-length member, and a cap assembly coupled to the can, the cap assembly having safety means fracturable in response to the variable-length member being increased in length.

23 Claims, 11 Drawing Sheets

CYLINDRICAL LITHIUM ION SECONDARY BATTERY HAVING FUNCTIONAL CENTER PIN

CROSS-REFERENCE TO RELATED APPLICATION

This application claims priority to and the benefit of Korean Patent Application No. 10-2005-0026410, filed on Mar. 30, 2005, in the Korean Intellectual Property Office, the entire disclosure of which is incorporated herein by reference.

BACKGROUND OF THE INVENTION

1. Field of the invention

The present invention relates to a cylindrical lithium ion secondary battery having a functional center pin, and more particularly, to a cylindrical lithium secondary battery capable of reducing the current interruption time in case of overcharging.

2. Description of Related Art

Typically, a cylindrical lithium ion secondary battery includes a cylindrical electrode assembly having a center pin coupled thereto, a cylindrical can to which the electrode assembly is coupled, an electrolyte injected into the can to enable lithium ions to move, and a cap assembly coupled to the can to prevent the electrolyte from leaking and the electrode assembly from escaping.

Cylindrical lithium ion secondary batteries typically have a capacity of 2000-2400 mA and are usually used for laptop computers, digital cameras, camcorders, etc., which require a large capacity of electric power. For example, a number of cylindrical lithium ion secondary batteries may be connected in series and in parallel as desired and are assembled in a hard pack of a predetermined shape with a protective circuit mounted thereon to be coupled to an electronic appliance and used as the power supply.

A cylindrical lithium ion secondary battery may be manufactured as follows: a negative electrode plate coated with a negative electrode active material, a separator, and a positive electrode plate coated with a positive electrode active material are laminated together. An end of the resulting laminate is coupled to a rod-shaped winding shaft and is wound into an approximately cylindrical shape to form an electrode assembly. Then, the electrode assembly is inserted into a cylindrical can and a center pin is inserted into the electrode assembly. An electrolyte is injected into the cylindrical can and a cap assembly is coupled to the cylindrical can to complete an approximately cylindrical lithium ion secondary battery.

In order to prevent the cylindrical lithium ion secondary battery from exploding in case of overcharging, the battery is provided with a safety vent which deforms when internal pressure rises due to overcharging, and a circuit board which interrupts the current as the safety vent deforms. The safety vent and the circuit board are also referred to together as current interruption devices (CIDs) and are included as part of the cap assembly.

The operation of the safety vent and the circuit board of a cylindrical lithium ion secondary battery will now be described in more detail.

When a cylindrical lithium ion secondary battery is overcharged, the electrolyte evaporates from the electrode assembly, causing increased resistance. In addition, lithium precipitates and deformation begins to occur in the central region of the electrode assembly. The increase of resistance in the electrode assembly may cause an abrupt rise in battery temperature.

When a battery is overcharged, cyclo hexyl benzene (CHB) and biphenyl (BP) (electrolyte additive) may decompose and generate gas, rapidly increasing the internal pressure of the battery. Such internal pressure deforms the safety vent toward the exterior of the battery. As a result, the circuit board positioned on the safety vent is fractured and interrupts the current. Specifically, the wiring pattern formed on the circuit board is fractured and current no longer flows. Such interruption of current prevents the battery from exploding or catching fire.

When the internal pressure of a battery rises above a critical level due to overcharging, the safety vent itself is torn off and internal gas is allowed to escape to the exterior.

A void volume or dead volume generally exists inside the battery. In particular, the space between the electrode assembly and the cap assembly or the space inside the center pin may be referred to as a void volume. The existence of a void volume is thought to delay the current interruption time and degrade the stability of the battery.

It is known in the art that, when the safety vent inside the battery deforms (or the circuit board fractures) at a pressure of about 5-11 $kgf/cm^2$ and the void volume is about 2 ml, for example, the amount of gas necessary for deformation of the safety vent is about 10-22 ml, although there may be some variance depending on the type of battery. However, even when CHB completely decomposes, which is included in the electrolyte at a ratio of 0.7% based on calculation, about 4.116 ml of gas is generated and, even when 0.3% of BP completely decomposes, about 1.833 ml of gas is generated. In addition, about 1.5 ml of gas is additionally generated in the degassing process. The total sum of gas from three different sources, however, is no more than about 7.449 ml and applies a force of about 3.75 $kgf/cm^2$ to the safety vent. In summary, although a pressure of about 5-11 $kgf/cm^2$ is necessary to deform the safety vent or break the circuit board in the case of overcharging, the void volume can actually provide a pressure of about 3.75 $kgf/cm^2$ at most. As a result, the safety vent is not fractured or the fracture time is delayed, thereby delaying the current interruption time. The longer current interruption is delayed, the more likely the battery will explode or catch fire due to overcharging. Although the amount of gas generated during overcharging may increase by increasing the amount of CHB or BP, which are electrolyte additives, there is a trade-off between degradation of capacity and quality of the battery.

SUMMARY OF THE INVENTION

A cylindrical lithium ion secondary battery is provided having a functional center pin adapted to undergo not only a chemical reaction, but also a mechanical reaction when the temperature rises above a critical level due to overcharging of the battery, in order to further advance the safety vent's operation time and current interruption time.

A cylindrical lithium ion secondary battery is also provided having a functional center pin adapted to reduce any unnecessary void volume inside the battery so that the safety vent's deformation time and current interruption time are advanced in the case of overcharging and the possibility of fire is minimized.

Also provided is a cylindrical lithium ion secondary battery having a functional center pin which can be manufactured at a low cost.

A lithium ion secondary battery including an electrode assembly, a center pin positioned within the electrode assembly, a variable-length member coupled to the center pin, the variable-length member adapted to increase in length when an interior temperature of the center pin reaches a critical temperature, a can containing the electrode assembly, the center pin, and the variable-length member, and a cap assembly coupled to the can, the cap assembly having safety means fracturable in response to the variable-length member being increased in length.

The variable-length member may include a stationary member fixed to the interior of the center pin, a movable member detachably coupled to the stationary member with its upper end protruding a predetermined length from the top of the center pin, and a spring coupled between the stationary member and the movable member and adapted to push the movable member towards the cap assembly at the critical temperature or higher.

In addition, the variable-length member may include a compressed spring, a wrapping member enclosing the spring and adapted to melt or fracture at the critical temperature or higher, and a gasification member and/or a non-flammable member positioned inside the wrapping member together with the spring and adapted to gasify at a predetermined voltage.

In accordance with another aspect of the present invention, there is provided a cylindrical lithium ion secondary battery having a functional center pin, the battery including an electrode assembly; a center pin coupled to the electrode assembly; a cap coupled to each of the upper and lower ends of the center pin; a can containing the electrode assembly, the center pin, and the cap; and a cap assembly coupled to the can.

The center pin may have a gasification member and/or a non-flammable member positioned therein, which gasifies at a predetermined voltage and is evacuated to the exterior through the cap at a critical temperature or higher and which suppresses fire, respectively.

The cylindrical lithium ion secondary battery having a functional center pin according to the present invention is advantageous in that, when the battery temperature reaches a predetermined level due to overcharging, not only the internal pressure increases due to the chemical reaction inside the battery, but also the mechanical reaction of the variable-length member directly deforms the safety vent positioned on the cap assembly. This further advances the current interruption time by means of the circuit board and prevents the battery from exploding or catching fire due to overcharging.

The variable-length member may include various functional materials, such as a gasification member and/or a non-flammable member, to operate the safety vent more quickly and accurately and avoid fire in a more active manner.

As the center pin is closed by the cap, the void volume decreases during initial overcharging and the internal pressure increases so that the safety vent deforms more quickly. When the battery temperature reaches a critical level or higher due to continuous overcharging, the cap fractures and the center pin acts as a channel to guarantee deformation or fracture of the safety vent. This prevents the battery from exploding due to overcharging.

The center pin, which is closed by the cap, may have a gasification member and/or a non-flammable member positioned therein to rapidly increase the internal pressure and avoid fire more actively.

When caps having a taper are coupled to the upper and lower ends of a center pin having no taper, respectively, the battery can be manufactured with little cost while maintaining its stability.

DETAILED DESCRIPTION

Figure 1A:
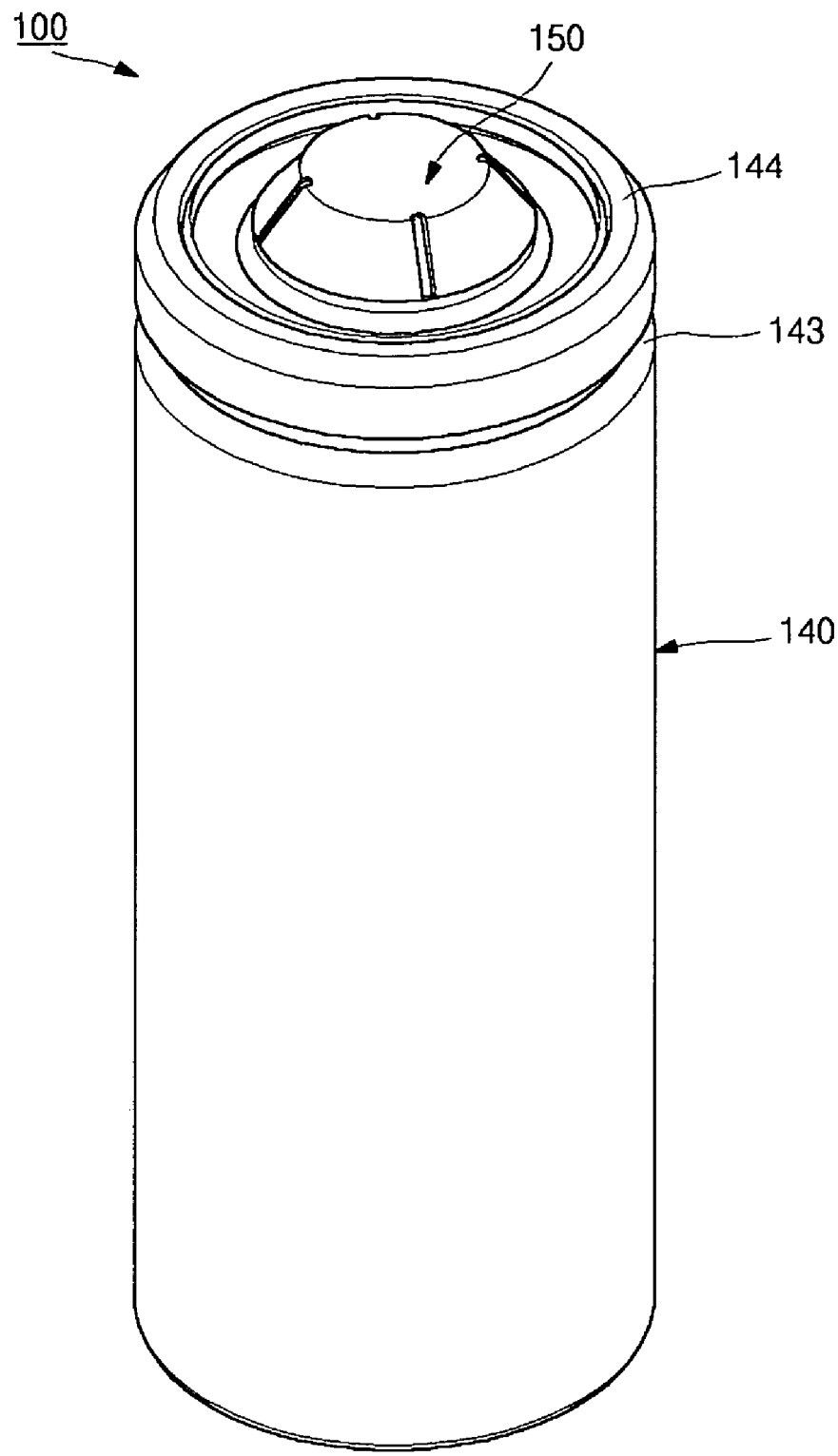
FIG. 1a is a perspective view showing a cylindrical lithium ion secondary battery having a functional center pin according to the present invention.
Figure 1B:
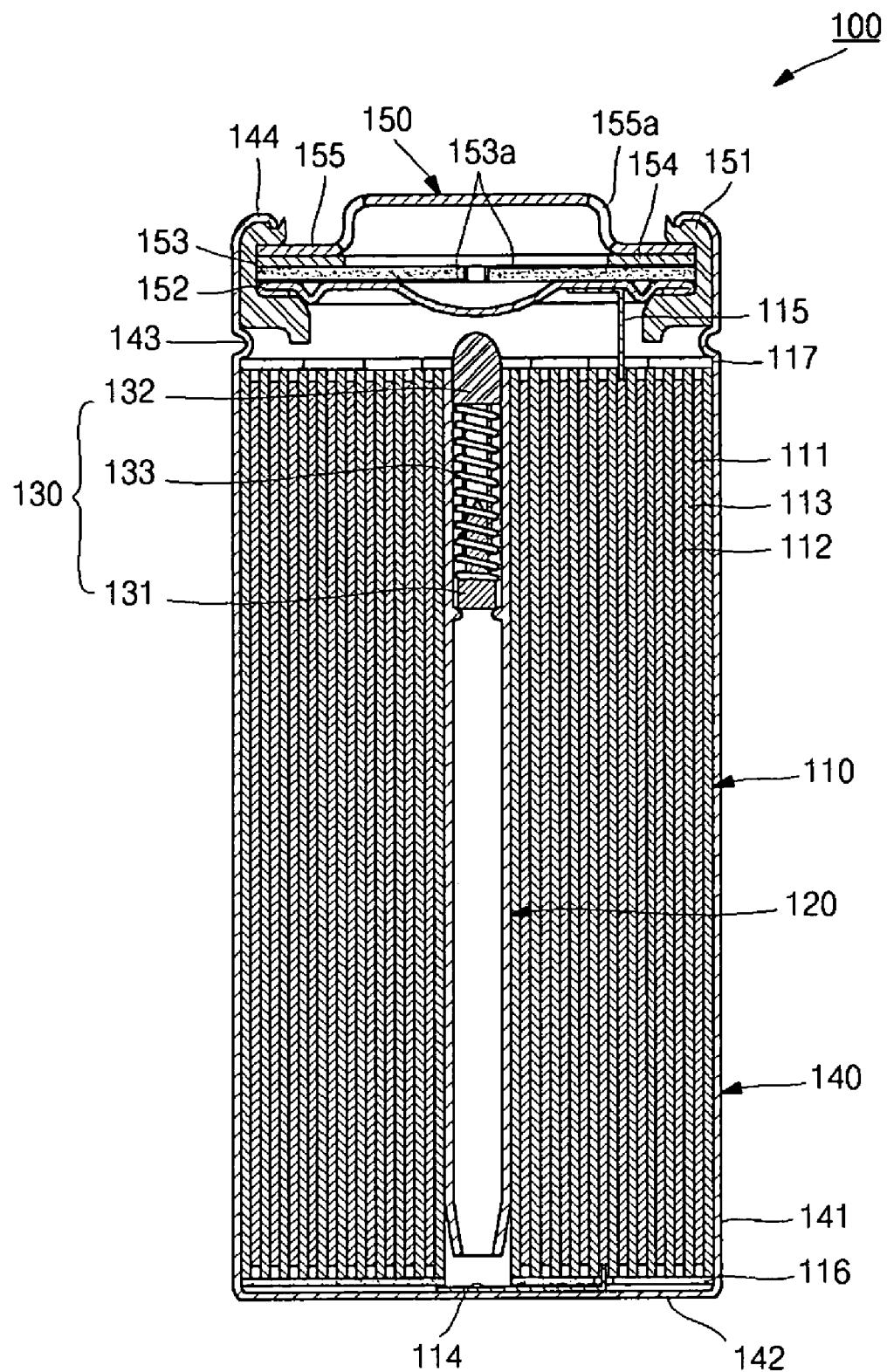
FIG. 1b is a sectional view showing a cylindrical lithium ion secondary battery having a functional center pin according to the present invention.
Figure 1C:
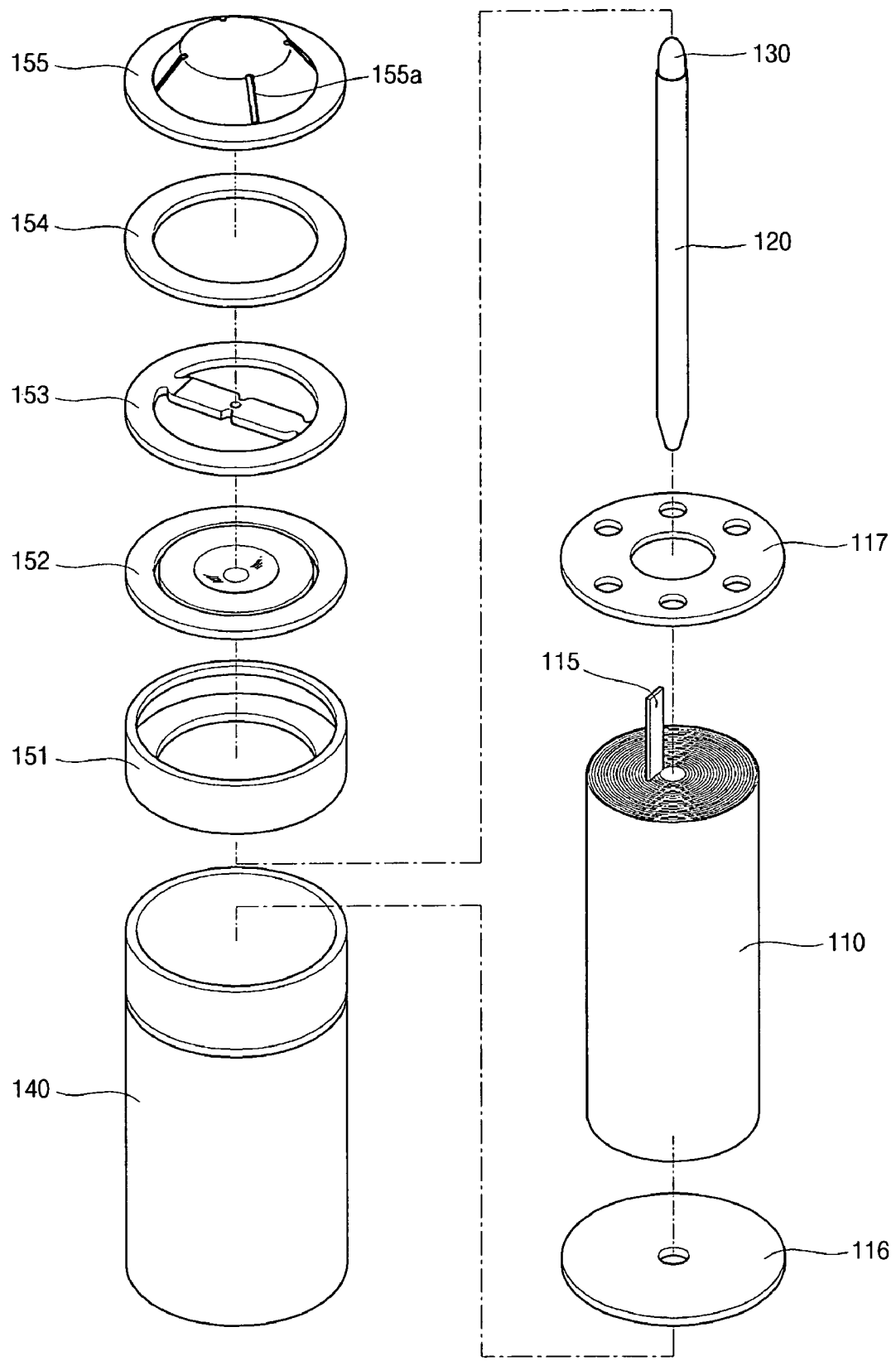
FIG. 1c is an exploded perspective view showing a cylindrical lithium ion secondary battery having a functional center pin according to the present invention.

As shown in FIGS. 1a-1c, the cylindrical lithium ion secondary battery 100 according to the present invention includes an electrode assembly 110, a center pin 120 coupled to the electrode assembly 110, a variable-length member 130 coupled to the center pin 120, a can 140 containing the electrode assembly 110, the center pin 120, and the variable-length member 130, and a cap assembly 150 covering the top of the can 140.

The electrode assembly 110 includes a negative electrode plate 111 coated with a negative electrode active material (for example, graphite), a positive electrode plate 112 coated with a positive electrode active material (for example, lithium cobalt oxide ($LiCoO_2$)), and a separator 113 positioned between the negative and positive electrode plates 111, 112 to avoid a short circuit and allow only lithium ions to move. The negative and positive electrode plates 111, 112 and the separator 113 are wound approximately into the shape of a cylinder and are contained in the cylindrical can 140. The negative electrode plate 111 may be made of copper (Cu) foil, the positive electrode plate 112 may be made of aluminum (Al) foil, and the separator 113 may be made of polyethylene (PE) or polypropylene (PP), but the material is not limited in the present invention. The negative electrode plate 111 may have a negative electrode tab 114 welded thereto and protruding a predetermined length downwards and the positive electrode plate 112 may have a positive electrode tab 115 welded thereto and protruding a predetermined length upwards, or vice versa. The negative electrode tab 114 may be made of nickel (Ni) and the positive electrode tab 115 may be made of aluminum (Al), but the material is not limited in the present invention.

The center pin 120 is coupled approximately to the center of the electrode assembly 110 and prevents the electrode assembly from deforming during charging/discharging of the battery. The center pin 120 has a protrusion formed in a predetermined position on the interior thereof while protruding a predetermined length, on which the variable-length member 130 is fixed.

The variable-length member 130, positioned on a protrusion inside the center pin 120, includes a stationary member 131, a movable member 132, and a spring 133. The movable member 132 protrudes a predetermined length from the exterior of the center pin 120 and is adapted to move towards the cap assembly 150 by elastic force from the spring 133 when the battery temperature reaches a critical level. The construction and operation of the variable-length member 130 will be described in more detail below.

The can 140 is generally cylindrical. More specifically, the can 140 has a cylindrical cross-section having a predetermined diameter and a generally disc-shaped bottom surface The top of the can 140 is open so that the electrode assembly 110 and the center pin 120 can be directly inserted into the can 140. The negative electrode tab 114 of the electrode assembly 110 may be welded to the bottom surface 142 of the cylindrical can 140. In this case, the cylindrical can 140 acts as the negative electrode. Alternatively, the positive electrode tab 115 may be welded to the bottom surface 142 of the cylindrical can 140, which then acts as the positive electrode. Lower and upper insulation plates 116, 117 are positioned on the lower and upper surfaces of the electrode assembly 110, respectively, to avoid an unnecessary short circuit between the electrode assembly 110 and the cylindrical can 140. The cylindrical can 140 may be made of steel, stainless steel, aluminum, or an equivalent thereof, but the material is not limited herein.

The cap assembly 150 may include a generally ring-shaped insulating gasket 151 coupled to the cylindrical can 140 and a conductive safety vent 152 coupled to the insulating gasket 151 and connected to the positive electrode plate 115. As is known in the art, the safety vent 152 deforms or fractures when the internal pressure of the can 140 rises and fractures the circuit board 153 (described later) and/or allows gas to escape to the exterior. A circuit board 153 is positioned on top of the safety vent 152 and is fractured when the safety vent 152 deforms, thereby interrupting current. A PTC device 154 is positioned on top of the circuit board 153 and interrupts the current in case of excessive current. A conductive positive (or negative) electrode cap 155 is positioned on top of the PTC device 154 to provide positive electrode voltage (or negative electrode voltage) to the exterior and is provided with a number of through-holes 155a for easy gas evacuation. The safety vent 152, the circuit board 153, the PTC device 154, and the positive electrode cap 155 are positioned inside the insulating gasket 151 to prevent the components from being short-circuited to the cylindrical can 140. The circuit board 153 has a wiring pattern 153a formed on the surface thereof which is naturally cut off when the circuit board 153 is fractured.

The cylindrical can 140 has a beading part 143 positioned on the lower portion of the cap assembly 150 which is recessed towards the interior of the battery, and a crimping part 144 formed on the upper portion of the cap assembly 150 which is bent towards the interior of the battery, to prevent the cap assembly 150 from escaping to the exterior. The beading and crimping parts 143, 144 firmly fix and support the cap assembly 150 to the cylindrical can 140 and prevent the electrolyte (described later) from leaking out.

The cylindrical can 140 has an electrolyte (not shown) injected therein to enable lithium ions to move, the ions being created by electrochemical reaction from the negative and positive electrode plates 111, 112 within the battery during charging/discharging. The electrolyte may be a non-aqueous organic electrolyte, which is a mixture of lithium salt and high-purity organic solvent. In addition, the electrolyte may be a polymer using a high-molecular electrolyte, but the type of the electrolyte is not limited herein.

Figure 2A:
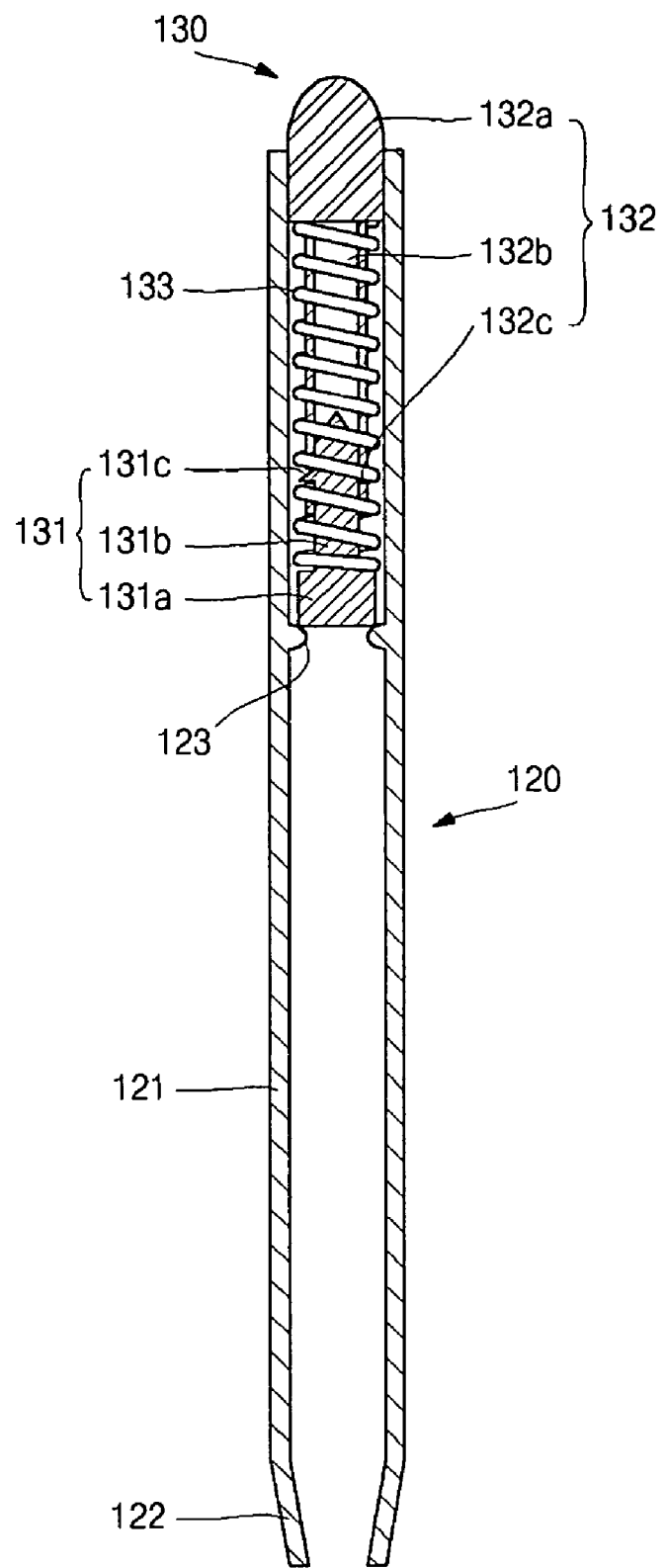
FIG. 2a is a sectional view showing a functional center pin of a cylindrical lithium ion secondary battery according to the present invention, in a pre-function state.
Figure 2B:
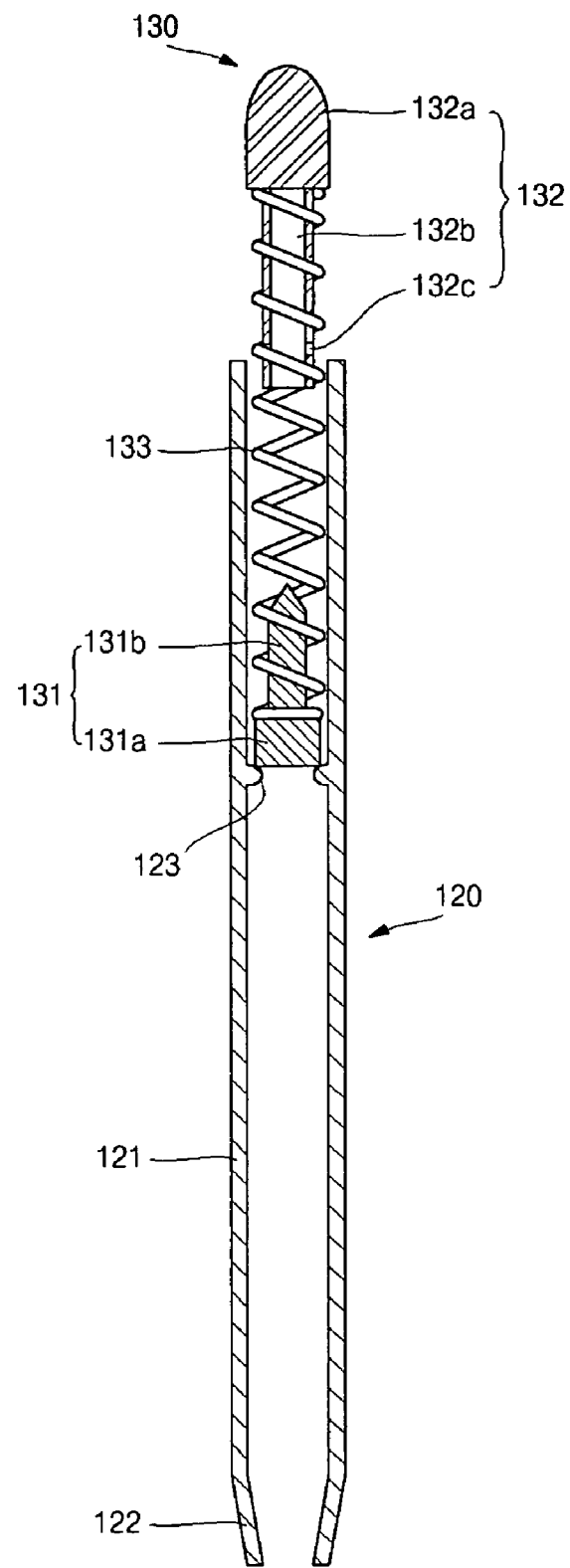
FIG. 2b is a sectional view showing a functional center pin of a cylindrical lithium ion secondary battery according to the present invention, in a post-function state.

Referring to FIGS. 2a and 2b, sectional views showing the functional center pin of the cylindrical lithium ion secondary battery according to the present invention are shown before and after the pin is used, respectively.

As shown in FIG. 2a, the center pin 120 has a body 121 extending a predetermined length and having open upper and lower ends. The body 121 has a protrusion 123 protruding toward a center of the body such that the variable-length member 130 can be fixed thereto, as mentioned above. The center pin 120 may have an inwardly-facing taper 122 formed on the lower end thereof to easily couple the center pin to the electrode assembly, thereby reducing manufacturing costs. The center pin 120 may be made of, for example, conventional steel, stainless steel, aluminum, and an equivalent thereof, or an alloy, but the material is not limited in the present invention.

The variable-length member 130 which is coupled to the center pin 120 includes a stationary member 131, a movable member 132, and a spring 133. The stationary member 131 is fixed to the protrusion 123. The movable member 132 is detachably coupled to the stationary member 131 with its upper end protruding a predetermined length from the top of the body 121 of the center pin 120. The spring 133 is coupled between the stationary member 131 and the movable member 132 to bias the movable member 132 towards the cap assembly (not shown) at a critical temperature or higher.

The construction and operation of the variable-length member 130 will now be described in more detail. The stationary member 131 includes a stationary base 131a placed on the protrusion 123 and an upper rod 131b extending a predetermined length from the top of the stationary base 131a so that the spring 133 can be coupled thereto. A latch 131c is formed on the upper rod 131b and is adapted to melt (or soften) at a critical temperature or higher. The latch 131c slightly protrudes towards the exterior of the upper rod 131b. The movable member 132 includes a movable base 132a protruding a predetermined length from the top of the body 121 of the center pin 120 and a lower rod 132b extending a predetermined length from the bottom of the movable base 132a and having the spring 133 coupled thereto. The lower rod 132b is hollow so that the upper rod 131b can be coupled thereto and has a latching groove 132c formed thereon so that the latch 131c of the upper rod 131b can be coupled thereto.

When the stationary member 131 and the movable member 132 are coupled to each other, the spring 133 is compressed and accumulates an elastic energy. In one exemplary embodiment, the critical temperature at which the latch 131c melts (or softens) is set to between about 80-120° C., which corresponds to the temperature at which the battery enters into a dangerous situation. If the critical temperature is set lower than 80° C., the variable-length member 130 may be erroneously used in a normal operation condition and interrupt a normal charging process. If the critical temperature is set higher than 120° C., the variable-length member 130 may fail to operate even in an overcharged condition and degrade the stability of the battery. The latch 131c may be made of a high-molecular resin so that it melts or softens at the above-mentioned critical temperature. More specifically, the latch 131c may be made from polyethylene, epoxy, acetal, indium, or an equivalent thereof, which has a melting point or softening point of between about 80-120° C., but the material is not limited in the present invention. The stationary member 131 and the movable member 132 may be made of the same material as the latch 131c, but their material is not limited herein.

As shown in FIG. 2b, the variable-length member 130 coupled to the center pin 120 is operated when the battery temperature reaches a critical level. More specifically, when the battery temperature reaches a critical level due to overcharging, the latch 131c formed on the upper rod 131b melts or softens. As a result, the movable member 132 which has been coupled to the upper rod 131b is biased closer to the cap assembly 150 by the spring 133. As such, the variable-length member 130 is operated mechanically to increases its length. In this process, the safety vent of the cap assembly deforms and the wiring pattern of the circuit board is cut off to interrupt the current as is described in more detail below.

Figure 3:
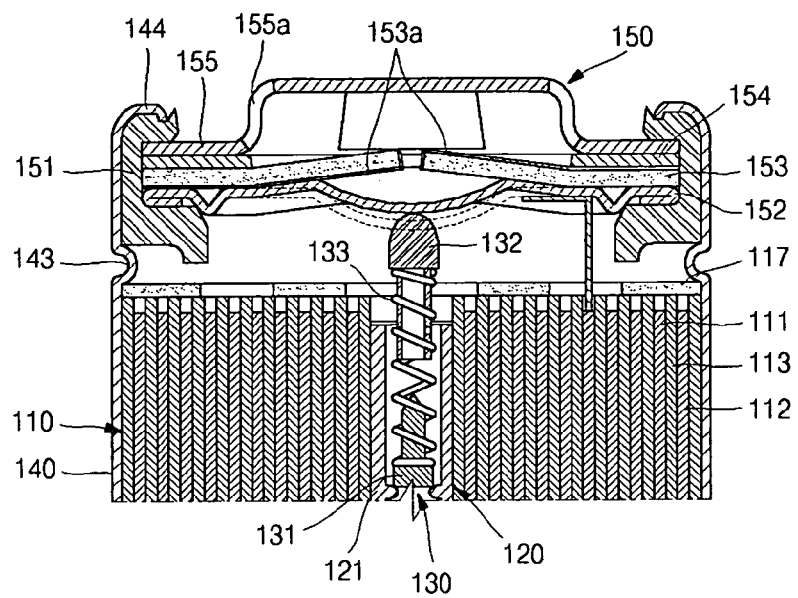
FIG. 3 is a partial sectional view showing a cylindrical lithium ion secondary battery having a functional center pin according to the present invention, in a post-function state.

Referring to FIG. 3, a partial sectional view shows the cylindrical lithium ion secondary battery having a functional center pin according to the present invention after the pin has been used.

Generally, the cylindrical lithium ion secondary battery is in an overcharged condition when the voltage is about 4-4.5V or higher during charging. In such an overcharged condition, the internal temperature of the battery reaches a critical level due to heating inside the battery, and specifically, the internal temperature may reach between about 80-150° C. As the battery's internal temperature reaches a critical level, the variable-length member 130 begins operation as mentioned above.

In particular, referring also back to FIGS. 2a and 2b, the latch 131c melts or softens and the lower rod 132b of the movable member 132 is biased away from the upper rod 131b by the spring 133. As a result, the movable member 132 moves a predetermined distance towards the cap assembly 150 and pushes the safety vent 152 of the cap assembly 150 in the same direction. The circuit board 153 positioned on the safety vent 152 is fractured and the wiring pattern 153a formed on the surface thereof is cut off. Consequently, the battery stops charging.

Gas may be generated by the electrode assembly 110 and the electrolyte (not shown) and is directed to push the safety vent 152 towards the cap assembly 150. However, such an increase in the internal pressure does not materially affect the present invention because the variable-length member 130 is operated mechanically.

Figure 4:
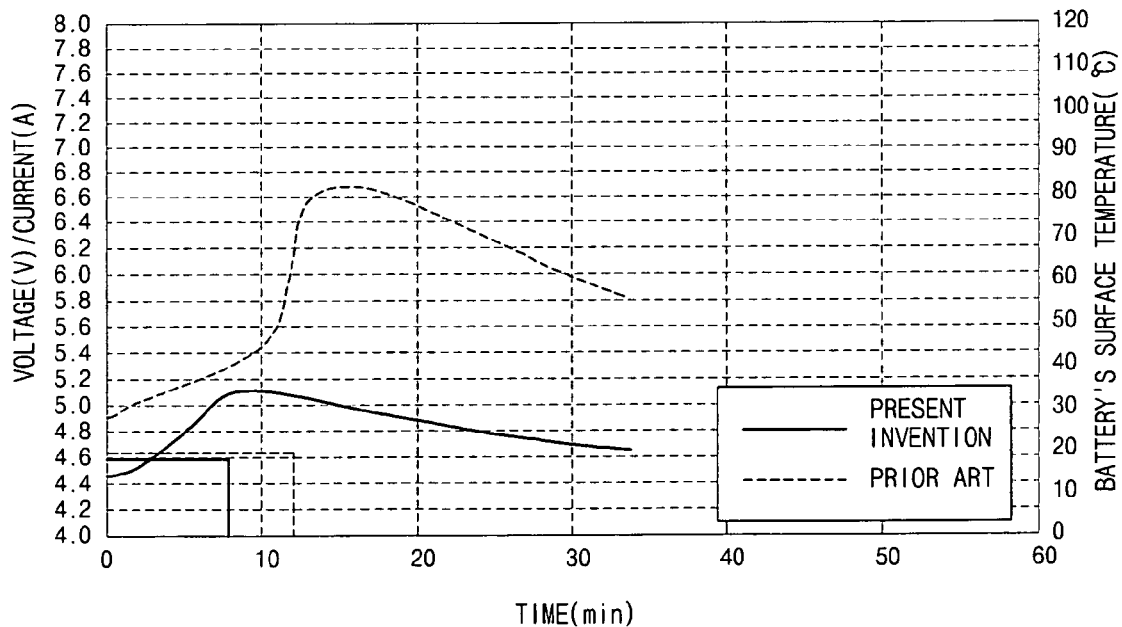
FIG. 4 is a graph showing the relationship among voltage/current, current interruption time, and battery surface temperature during overcharging for comparison between a cylindrical lithium ion secondary battery having a functional center pin according to the present invention and a cylindrical lithium ion secondary battery having a center pin according to the prior art.

Referring to FIG. 4, a graph showing the relationship among voltage/current, current interruption time, and battery surface temperature in the case of overcharging for comparison between a cylindrical lithium ion secondary battery having a functional center pin according to the present invention and a cylindrical lithium ion secondary battery having a center pin according to the prior art is illustrated.

As shown, the left Y-axis indicates voltage/current values, the right Y-axis indicates the battery surface temperature values, and the lower X-axis indicates the circuit board's operation time (i.e., time elapsed during overcharging). In the graph, broken lines show the characteristics of a cylindrical lithium ion secondary battery having a center pin according to the prior art and solid lines show the characteristics of a cylindrical lithium ion secondary battery having a center pin according to the present invention.

It is clear from the graph that, in the case of the conventional battery, the current is interrupted 12 minutes after the overcharged condition is initiated at about 4.6V. Thus, a dangerous condition of potential explosion or fire lasts as long as 12 minutes. The battery surface temperature reaches 80° C. or higher, even when the current is interrupted. This corresponds to a very thermally unstable condition. The internal temperature of the battery is about 200° C. and, in this state, explosion or fire generally occurs.

In the case of the inventive battery, in contrast, the current is interrupted after about 8 minutes after the overcharged condition is initiated at about 4.6V. Thus, the dangerous condition time is shortened by about 4 minutes. In addition, the battery surface temperature remains below about 30° C., corresponding to a thermally stable condition. The internal temperature of the battery is between about 80-120° C. and there is little danger of explosion or fire.

Figure 5A:
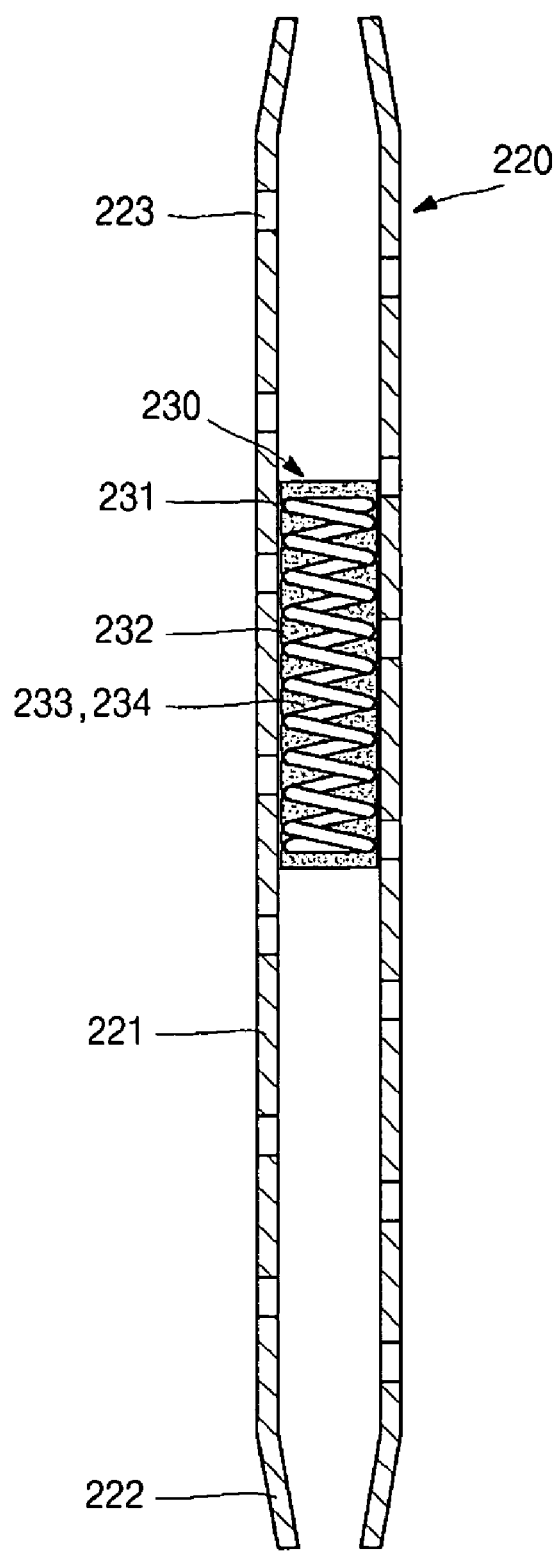
FIG. 5a is a sectional view showing an alternative functional center pin of a cylindrical lithium ion secondary battery according to the present invention, in a pre-function state.
Figure 5B:
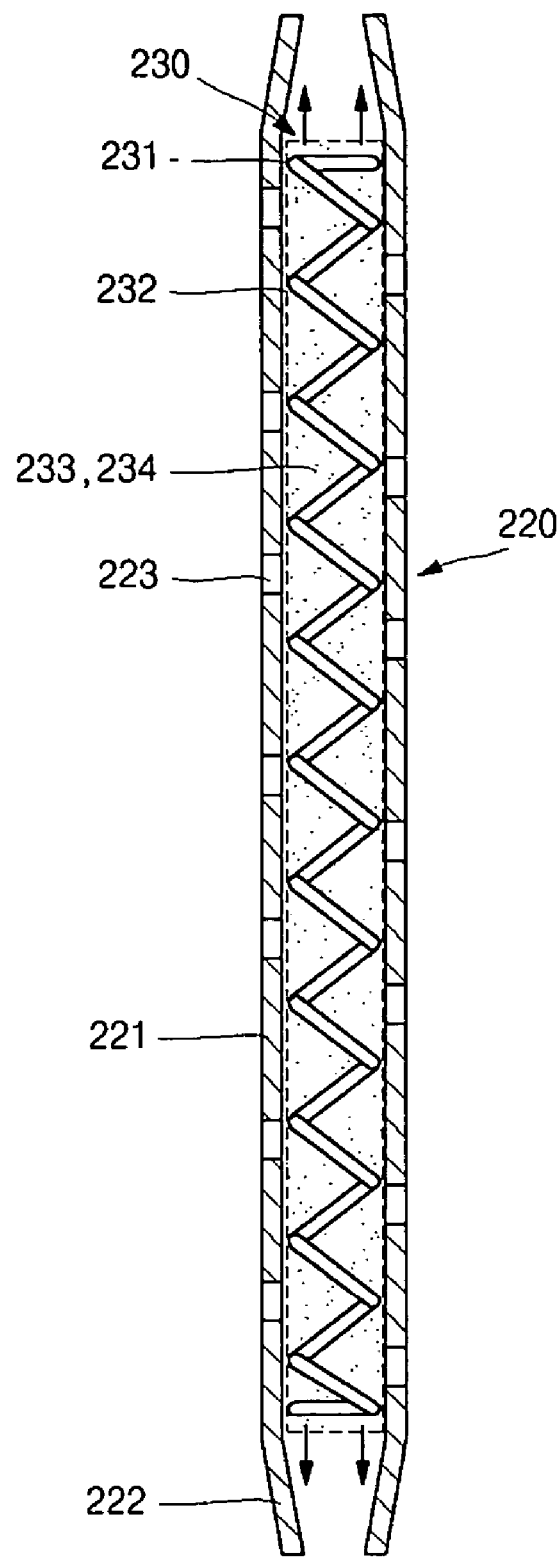
FIG. 5b is a sectional view showing an alternative functional center pin of a cylindrical lithium ion secondary battery according to the present invention, in a post-function state.

Referring to FIGS. 5a and 5b, sectional views show an alternative functional center pin of the cylindrical lithium ion secondary battery according to the present invention, before and after the pin is used, respectively.

As shown in FIG. 5a, the center pin 220 has a body 221 extending a predetermined length with open upper and lower ends and an inwardly directed taper 222 formed on each of the upper and lower ends thereof, where the diameter decreases gradually. The center pin 220 has at least one hole 223 formed on the surface of the body 221 to quickly allow evacuation of the gasification member and/or the non-flammable member (described later) to the exterior of the center pin 220 at a critical temperature. However, the structure thereof is not limited in the present invention.

The center pin 220 has a variable-length member 230 positioned on the interior thereof. However, the variable-length member 230 has a different structure from that of the variable-length member of the above-mentioned center pin 120 and, specifically, it has no region exposed to the exterior of the center pin.

The variable-length member 230 includes a spring 231 compressed to a predetermined length, a wrapping member 232 enclosing the spring 231 and adapted to melt or fracture at a critical temperature, and a gasification member 233 positioned inside the wrapping member 232 together with the spring 231 and adapted to gasify at a predetermined voltage.

The compressed condition of the spring 231 facilitates melting or fracture of the wrapping member 232. In one exemplary embodiment, the critical temperature at which the wrapping member 232 melts or fractures is between about 80-120° C., which corresponds to a dangerous battery condition. The wrapping member 232 may be made of a high-molecular resin to obtain such a critical temperature. More particularly, the wrapping member 232 may be made from polyethylene, epoxy, acetal, indium, or an equivalent thereof, which has a melting point or softening point of between about 80-120° C., but the material is not limited in the present invention. The wrapping member may include an inorganic filler so that the wrapping member can melt or fracture more easily at the critical temperature. Specifically, the wrapping member 232 may include silica nano-powder, alumina, or an equivalent thereof, or a mixture of the mentioned materials, to accelerate melting or fracture at the critical temperature, but the material is not limited in the present invention.

The wrapping member 232 may have a gasification member 233 positioned therein together with the spring 231. The gasification member 233 may be made of a material which decomposes and gasifies at about 4-4.5V or higher, which corresponds to the overcharged voltage of the battery. More particularly, the gasification member 233 may be made of any one of cyclo hexyl benzene (CHB), biphenyl (BP), and an equivalent thereof, which is added to the electrolyte, but the material is not limited in the present invention. In addition to the gasification member 233, the wrapping member 232 may include various functional materials therein, including a non-flammable member 234. The non-flammable member 234 may be made a magnesium hydroxide-based material, an aluminum hydroxide-based material, a halogen-based material, an antimony trioxide-based material, a melamine-based material, a phosphate-based material, or an equivalent or a mixture thereof, but the material is not limited in the present invention.

As shown in FIG. 5b, the wrapping member 132 melts or fractures when the temperature of the center pin 220 and the variable-length member 230 reaches a critical level (80-150° C.) due to overcharging of the battery. The elastic force from the compressed spring 231 positioned inside the wrapping member 232 facilitates melting or fracture of the wrapping member 232. When the wrapping member 232 includes an inorganic filler, it melts or fractures more easily. As the wrapping member 232 melts or fractures, the gasification member 233 and/or the non-flammable member 234 positioned therein are freed to the exterior, and more specifically, into the electrode assembly and the electrolyte (not shown). Since the voltage of the battery is between about 4-4.5V (overcharged voltage), the gasification member 233 decomposes after being freed and generates a large amount of gas. As a result, the internal pressure of the battery increases abruptly and the safety vent deforms easily. The wiring pattern of the circuit board is quickly cut off when the safety vent deforms, and the overcharged current is interrupted rapidly. The non-flammable member 234 actively prevents the electrolyte or the electrode assembly from catching fire. Consequently, the battery is efficiently prevented from catching fire or exploding.

The construction of the electrode assembly, to which the variable-length member 230 and the center pin 220 are coupled, the cylindrical can, to which the electrode assembly is coupled, and the cap assembly coupled to the cylindrical can is the same as in the case of the above-mentioned battery 100 and repeated description and illustration thereof will be omitted.

Figure 6A:
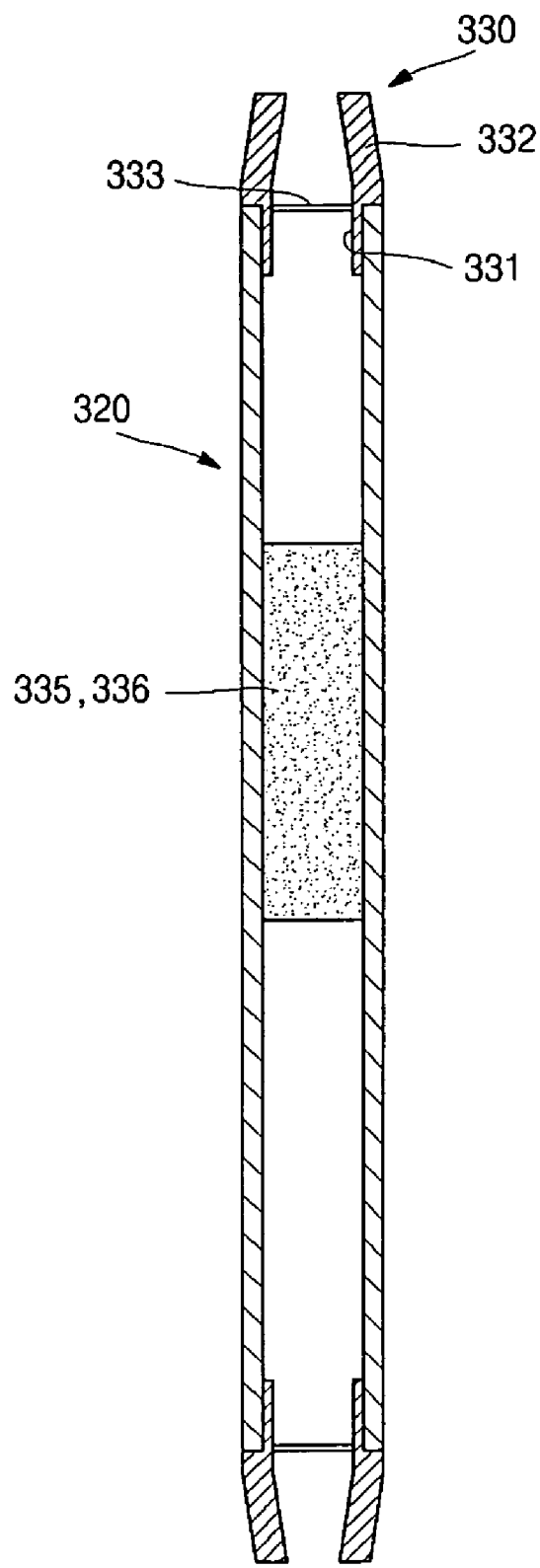
FIG. 6a is a sectional view showing an alternative functional center pin of a cylindrical lithium ion secondary battery according to the present invention, in a pre-function state.
Figure 6B:
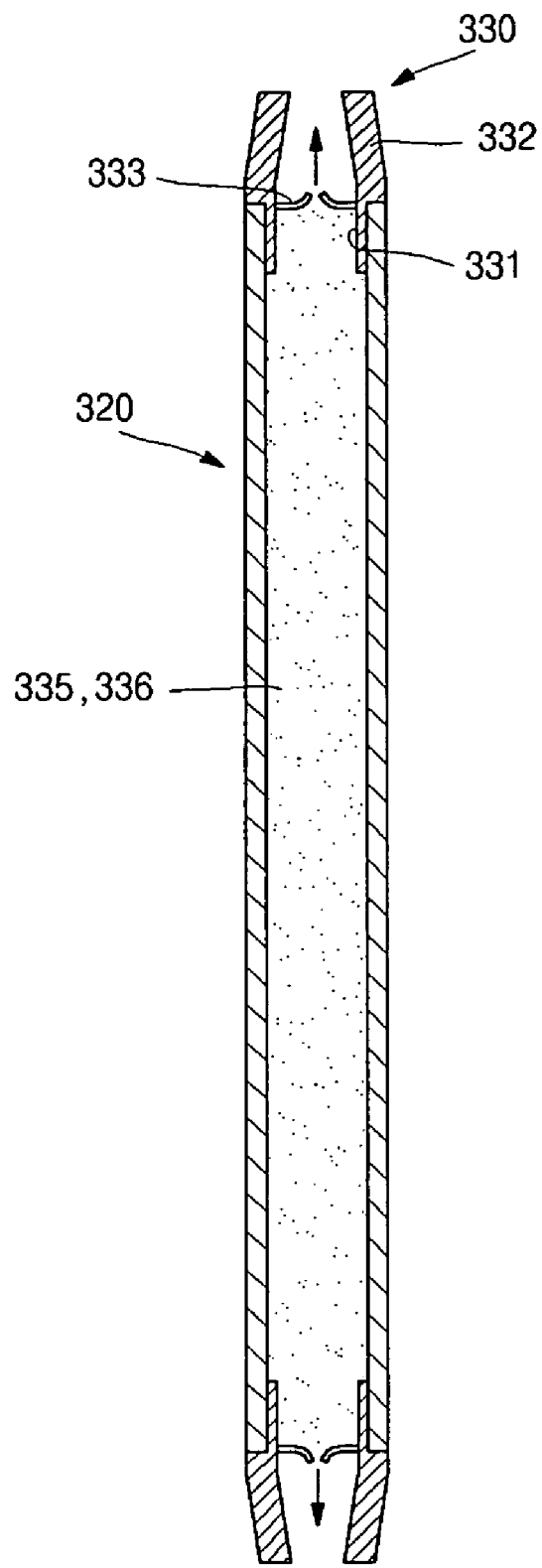
FIG. 6b is a sectional view showing an alternative functional center pin of a cylindrical lithium ion secondary battery according to the present invention, in a post-function state.

Referring to FIGS. 6a and 6b, sectional views illustrate an alternative functional center pin of the cylindrical lithium ion secondary battery according to the present invention, before and after the pin is used, respectively.

As shown in FIG. 6a, the center pin 320 has a linear shape and its upper and lower ends are open. A cap 330 is coupled to each of the upper and lower ends of the center pin 320 to close it and minimize any unnecessary void volume or dead volume inside the battery.

The cap 330 includes a coupling unit 331 directly fitted into the center pin 320 and a taper unit 332 positioned on the exterior of the center pin 320 while being integral with the coupling unit 331. The taper 332 has a diameter gradually decreasing from that of the center pin 320. The cap 330 has a thin film 333 formed between the coupling unit 331 and the taper unit 332. The film 333 may be made of a material identical to or different from that of the coupling unit 331 and the taper unit 332. The film 333 may be made of a high-molecular material which melts or fractures at a critical temperature (80-120° C.), which corresponds to a dangerous battery condition. The film 333 may be made from polyethylene, epoxy, acetal, indium, or an equivalent thereof, which melts or fractures at the critical temperature, but the material is not limited herein.

The center pin 320 may have a gasification member 335 positioned therein, which decomposes at a predetermined voltage or higher and generates gas. Specifically, the gasification member 335 decomposes and generates gas at a voltage of about 4-4.5V, which corresponds to overcharged voltage of the battery. More particularly, the gasification member 335 may be made of cyclo hexyl benzene (CHB), biphenyl (BP), or an equivalent thereof, but the material is not limited herein.

In addition to the gasification member 335, the center pin 320 may have various functional materials positioned therein, including a non-flammable member 336. The non-flammable member 336 may be made from a magnesium hydroxide-based material, an aluminum hydroxide-based material, a halogen-based material, an antimony trioxide-based material, a melamine-based material, a phosphate-based material, or an equivalent or a mixture thereof, but the material is not limited herein.

When the temperature of the battery reaches a critical level (80-150° C.) due to overcharging, as shown in FIG. 6b, the film 333 melts or fractures. As the cap 330 melts or fractures, the gasification member 335 positioned therein is freed to the exterior, and specifically into the electrode assembly and the electrolyte. Since the voltage of the battery is about 4-4.5V or higher (overcharged voltage), the gasification member 335 decomposes after being evacuated and generates a large amount of gas. As a result, the internal pressure increases abruptly and the safety vent is fractured. The wiring pattern of the circuit board is cut off when the safety vent deforms, thereby interrupting the current.

The center pin 320 may have a non-flammable member 336 positioned together with the gasification member 335. In this case, the non-flammable member 336 is freed into the electrode assembly and the electrolyte. The non-flammable member 336 actively prevents the electrode assembly and the electrolyte from catching fire. Consequently, the battery is prevented from catching fire or exploding.

The construction of the electrode assembly, to which the cap 330 and the center pin 320 are coupled, the cylindrical can, to which the electrode assembly is coupled, and the cap assembly coupled to the cylindrical can is the same as in the case of the above-mentioned battery 100 and repeated description and illustration thereof will be omitted.

The center pin 320 does not necessarily taper at either the upper or lower ends thereof, as in the prior art, and can be manufactured at little cost.

Figure 7:
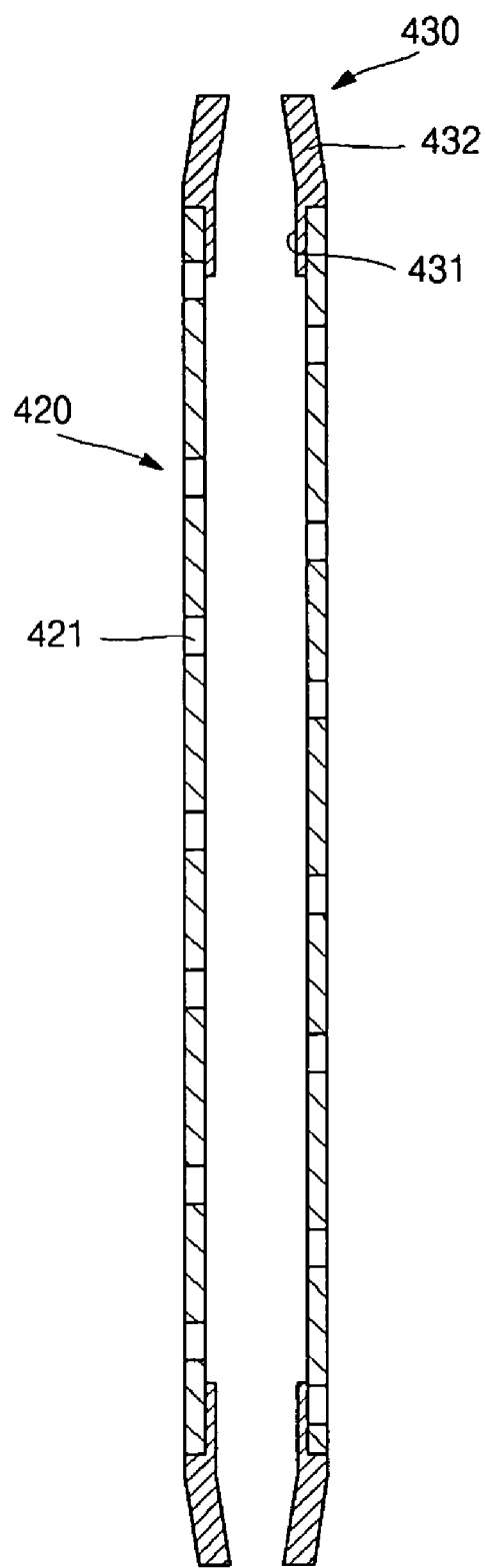
FIG. 7 is a sectional view showing an alternative functional center pin of a cylindrical lithium ion secondary battery according to the present invention.

Alternatively, as shown in FIG. 7, a cap 430 without a film may be coupled to the center pin 420 to further reduce the cost. The cap 430 has a taper unit 432 protruding from the exterior of the center pin 420 to easily couple the center pin 420 to the electrode assembly and minimize the deformation of the center pin 420. Although the center pin 420 is shown in the drawing to have at least one hole 421 formed on the surface thereof to easily induce gas which is generated from the electrolyte during overcharging to the interior of the center pin 420, the hole is not always necessary. Although not shown in the drawings, the hole may be formed on all center pins previously described and shown in the figures.

As mentioned above, a cylindrical lithium ion secondary battery having a functional center pin according to the present invention is provided such that when the battery temperature reaches a predetermined level due to overcharging, not only does the internal pressure increase due to the chemical reaction inside the battery, but also the mechanical reaction of the variable-length member directly deforms the safety vent positioned on the cap assembly. This further advances the current interruption time by means of the circuit board and prevents the battery from exploding or catching fire due to overcharging.

The variable-length member may include various functional materials, such as a gasification member and/or a non-flammable member, to operate the safety vent more quickly and accurately and avoid fire in a more active manner.

Since the center pin is sealed by the cap, the void volume decreases during initial overcharging and the internal pressure increases so that the safety vent deforms more quickly. When the battery temperature reaches a critical level due to continuous overcharging, the cap fractures and the center pin acts as a channel to guarantee deformation or fracture of the safety vent. This prevents the battery from exploding due to overcharging.

The center pin may have a gasification member and/or a non-flammable member positioned therein to rapidly increase the internal pressure and avoid fire more actively.

When caps having a taper are coupled to the upper and lower ends of a center pin without a taper, the battery may be manufactured at little cost while maintaining its stability.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium ion secondary battery comprising:
an electrode assembly;
a center pin positioned within the electrode assembly;
a variable-length member coupled to the center pin, the variable-length member adapted to increase in length when an interior temperature of the center pin reaches a critical temperature;
a can containing the electrode assembly, the center pin, and the variable-length member; and
a cap assembly coupled to the can, the cap assembly having a safety vent fracturable in response to the variable-length member being increased in length.

2. The lithium ion secondary battery as claimed in claim 1, wherein the center pin comprises:
a body having an open upper end and an open lower end; and
a protrusion on the interior of the body for fixing the variable-length member thereto.

3. The lithium ion secondary battery as claimed in claim 2, wherein the center pin has a taper on at least one of the open lower end and the open upper end, the taper having a diameter decreasing distally from the body.

4. The lithium ion secondary battery as claimed in claim 1, wherein the lithium ion secondary battery is adapted to stop charging when the charging voltage reaches about 4-4.5V or higher, and
wherein the lithium ion secondary battery maintains a surface temperature of between about 30-60° C.

5. The lithium ion secondary battery as claimed in claim 2, wherein the center pin has at least one hole on the surface of the body.

6. The lithium ion secondary battery as claimed in claim 1, wherein the lithium ion secondary battery is a cylindrical lithium ion secondary battery.

7. A lithium ion secondary battery comprising:
an electrode assembly;
a center pin within the electrode assembly;
a variable-length member coupled to the center pin, the variable-length member adapted to increase in length when an interior temperature of the center pin reaches a critical temperature;
a can containing the electrode assembly, the center pin, and the variable-length member; and
a cap assembly coupled to the can, the cap assembly having safety means fracturable in response to the variable-length member being increased in length,
wherein the center pin comprises:
a body having an open upper end and an open lower end; and
a protrusion on the interior of the body for fixing the variable-length member thereto, and
wherein the variable-length member comprises:
a stationary member fixed to the protrusion;
a movable member detachably coupled to the stationary member, an upper end of the movable member protruding a predetermined length from the body; and
a spring coupled between the stationary member and the movable member, the spring adapted to bias the movable member towards the cap assembly at the critical temperature.

8. The lithium ion secondary battery as claimed in claim 7, wherein the stationary member comprises a stationary base fixed to the protrusion and an upper rod extending from an end of the stationary base, the upper rod having a latch adapted to melt at the critical temperature;
wherein the movable member comprises a movable base protruding from the open upper end and a lower rod extending from an end of the movable base, the lower rod having a latching groove to which the latch of the upper rod is coupled, and
wherein a spring is coupled between the stationary base and the movable member.

9. The lithium ion secondary battery as claimed in claim 8, wherein the critical temperature is between about 80-120° C.

10. The lithium ion secondary battery as claimed in claim 8, wherein the latch is made of a high-molecular resin.

11. The lithium ion secondary battery as claimed in claim 8, wherein the latch is made of one selected from the group consisting of polyethylene, epoxy, acetal, and indium.

12. A lithium ion secondary battery comprising:
an electrode assembly;
a center pin within the electrode assembly;
a variable-length member coupled to the center pin, the variable-length member adapted to increase in length when an interior temperature of the center pin reaches a critical temperature;
a can containing the electrode assembly, the center pin, and the variable-length member; and
a cap assembly coupled to the can, the cap assembly having safety means fracturable in response to the variable-length member being increased in length,
wherein the safety means comprises:
a safety vent positioned to have a surface contactable by the variable-length member; and
a circuit board on a surface of the safety vent opposite the surface contactable by the variable-length member.

13. The lithium ion secondary battery as claimed in claim 12, wherein the variable-length member is adapted to deform the safety vent to interrupt the current in the circuit board between about 2-10 minutes of when the charging voltage reaches at least about 4-4.5V.

14. A lithium ion secondary battery comprising:
an electrode assembly;
a center pin within the electrode assembly;
a variable-length member coupled to the center pin, the variable-length member adapted to increase in length when an interior temperature of the center pin reaches a critical temperature;
a can containing the electrode assembly, the center pin, and the variable-length member; and
a cap assembly coupled to the can, the cap assembly having safety means fracturable in response to the variable-length member being increased in length,
wherein the variable-length member comprises:
a compressed spring;
a wrapping member enclosing the spring and adapted to melt or fracture at the critical temperature; and
a gasification member inside the wrapping member and adapted to gasify at a predetermined voltage.

15. The lithium ion secondary battery as claimed in claim 14, wherein the critical temperature is between about 80-120° C.

16. The lithium ion secondary battery as claimed in claim 14, wherein the wrapping member is made of a high-molecular resin.

17. The lithium ion secondary battery as claimed in claim 14, wherein the wrapping member is made of one selected from the group consisting of polyethylene, epoxy, acetal, and indium.

18. The lithium ion secondary battery as claimed in claim 17, wherein the wrapping member further comprises an inorganic filler for easy melting or fracture.

19. The lithium ion secondary battery as claimed in claim 18, wherein the inorganic filler is selected from one of the group consisting of silica nano-powder and alumina, or a mixture thereof.

20. The lithium ion secondary battery as claimed in claim 14, wherein the gasification member is adapted to gasify at a voltage of between about 4-4.5V or higher.

21. The lithium ion secondary battery as claimed in claim 20, wherein the gasification member comprises at least one of cyclo hexyl benzene (CHB) and biphenyl (BP).

22. The lithium ion secondary battery as claimed in claim 14, wherein the wrapping member has a non-flammable member therein.

23. The lithium ion secondary battery as claimed in claim 22, wherein the non-flammable member comprises at least one of the group consisting of a magnesium hydroxide-based material, an aluminum hydroxide-based material, a halogen-based material, an antimony trioxide-based material, a melamine-based material, and a phosphate-based material.

* * * * *